Sept. 7, 1926.
F. W. MARTIN
1,598,616
STARTING AND DRIVING MECHANISM FOR LOCOMOTIVES
Filed Nov. 21, 1924
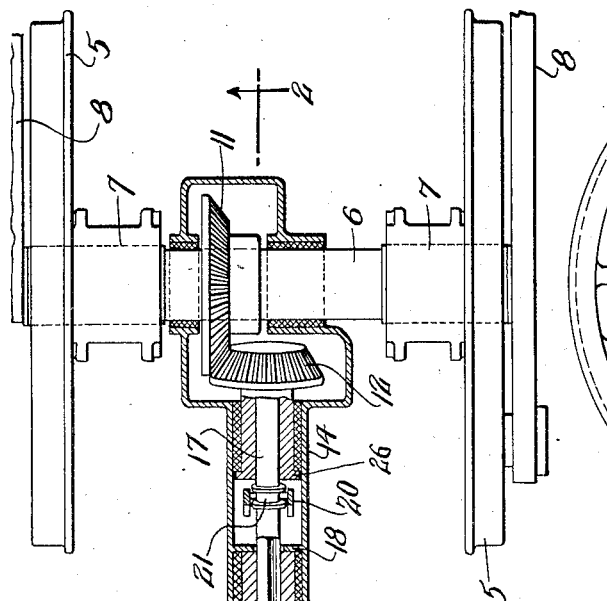
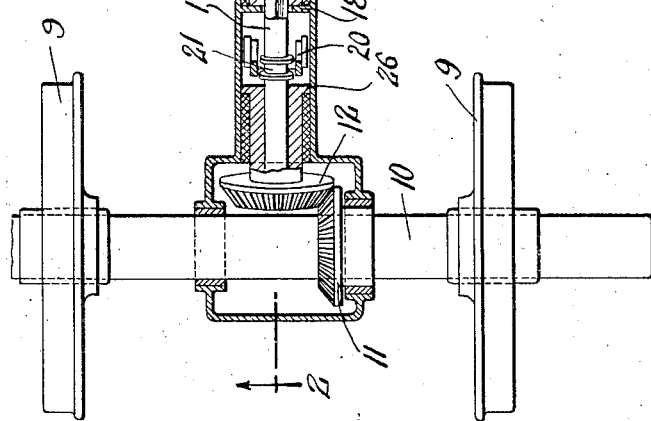
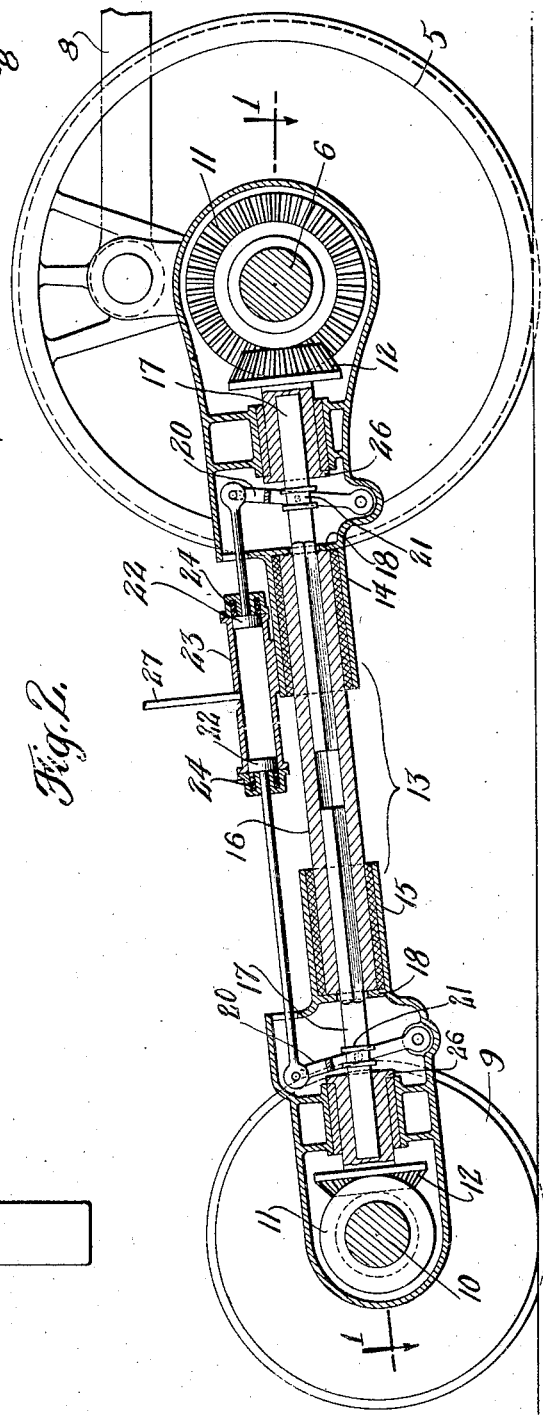
INVENTOR
Frederick W. Martin
BY
Synnestvedt & Lechner
ATTORNEYS Patented Sept. 7, 1926.

1,598,616

UNITED STATES PATENT OFFICE.

FREDERICK W. MARTIN, OF BROOKLYN, NEW YORK, ASSIGNOR TO FRANKLIN RAILWAY SUPPLY COMPANY, A CORPORATION OF DELAWARE.

STARTING AND DRIVING MECHANISM FOR LOCOMOTIVES.

Application filed November 21, 1924. Serial No. 751,293.

My invention relates to starting and driving mechanism for locomotives. In suitable forms of embodiment, such as hereinafter described, the invention obviates slippage of a locomotive, gives extra or augmented effective power when needed, and, in general, affords the advantages of "boosters," such as now widely used on steam locomotives. Other objects and advantages that may be realized through the invention will become apparent from my description of one form of embodiment.

In the drawings, Fig. 1 is a fragmentary and somewhat diagrammatic plan view, showing a pair of drive wheels and a pair of other weight supporting wheels, with means for interconnecting them for the purposes of my invention,—certain parts being in section as indicated by the line 1—1 in Fig. 2.

Fig. 2 is a similar side view, with various parts in vertical section as indicated by the line 2—2 in Fig. 1.

The drawings show a pair of drive wheels 5, 5, one or both fast to an axle 6 mounted in driving boxes 7, and actuated as usual through the rods 8, 8 (either main rods from the engine cross-heads, not shown, or side rods connecting the drivers 5, 5 to other drivers, not shown, themselves ultimately connected to the cross-heads and thus to the pistons in the engine cylinders). Another pair of wheels 9, 9 also appear, one or both fast to an axle 10. These wheels 9, 9 are not normal drivers, but may be any other weight supporting wheels, such as those of a leading or trailing truck of the locomotive, or even of a tender truck.

For reasons to be presently explained, I provide for connection between one or more such wheels 9 and one or more normal drivers such as 5, 5. In the present instance, this is accomplished by means of coacting bevel gears 11, 12 at each of the axles 6, 10, and fore and aft shafting 13 for interconnecting the gears 12, 12. As shown, the bevel gears 11, 11 are fast on the axles 6, 10, while the gears 12, 12 and the shafting 13 are mounted in bearings in casing structures 14, 15 that enclose the gears and contain lubricant for gears and bearings. The shafting 13 comprises a main square-bored hollow section 16 and a pair of shafts 17, 17 fast to the pinions 12, 12 at their outer ends and having their squared inner ends engaged in the bore of the shaft 16. While the shaft 16 is kept from shifting lengthwise by engagement of its ends with internal shoulders 18, 18 on the casings 14, 15, the gears are shiftable axially in their bearings, out of and into mesh with the gears 11, so as to disconnect the shafting 13 from both axles 6, 10 and vice-versa. The shifting may be effected by any suitable means, such as forked levers 20, 20 fulcrumed in the casings 14, 15 and pivoted to collars 21, 21 engaged in grooves in the shafts 17, 17. The upper ends of the levers 20, 20 have pin and slot connections to the rods of pistons 22, 22 in an operating cylinder 23, mounted on the casing 14, and helical compression springs 24, 24 are interposed between the pistons and the ends of the cylinder. So long as pressure is maintained in the cylinder, the springs 24, 24 are held compressed, and the gears 12, 12 are kept in mesh with the gears 11, 11,—their motion toward the latter being limited by engagement of shoulders 26, 26 on their hubs with their bearings in the casings 14, 15. When pressure in the cylinder 23 is relieved or exhausted, however, the gears 12 are automatically thrown out of mesh by the springs 24, 24. Pressure may be admitted to the cylinder 23 and exhausted through a pipe 27 in any suitable manner, as by a control system (not shown) such as used for locomotive boosters.

The ability of a locomotive to start and accelerate without slippage depends on the total friction of its driving wheels with the track (as well as on the power of its engines), and thus naturally depends on the weight carried by the drivers. The ratio between the weight on the drivers and the tractive force when the full power of the locomotive is employed is termed the "factor of adhesion." When this is relatively low, the ability to start is precarious; when it is high, there is a margin to take care of unfavorable conditions of the track. The factor of adhesion is necessarily dependent on the power of the locomotive; i. e., a locomotive with very large cylinders and high boiler pressure, overpowered in proportion to its driver friction, has a low factor of adhesion.

By connecting the wheels 9, 9 to the drivers 5, 5 during starting and accelerating, as shown in Figs. 1 and 2, the number of drivers, the total weight on drivers, and the total friction are increased, and the factor of adhesion thus increased; while by disconnecting the wheels 5, 5, and 9, 9 from one another and from the gears 12, 12 and the shafting 13, 13 as the locomotive comes up to speed, the locomotive is freed of the drag represented by the friction of these parts at high speed, and useless wear on them is avoided.

My invention, therefore, is peculiarly applicable to locomotives that are overpowered, or have, at any rate, a low factor of adhesion.

I claim:

1. The combination with a locomotive, of means for connecting other weight-supporting wheels to its normal drivers, to prevent slippage of the latter during acceleration, together with means for disconnecting them when the locomotive comes up to speed.

2. The combination with a locomotive having a low factor of adhesion, of means for auxiliary connecting other weight-supporting wheels to its normal drivers while the locomotive is accelerating, to prevent slippage of the drivers, and for disconnecting them when the locomotive comes up to speed.

3. The combination with a locomotive having a low factor of adhesion, of means for connecting other weight-supporting wheels to its normal drivers during acceleration, with means for disconnecting said first-mentioned means from both driving and other weight-supporting wheels when the locomotive comes up to speed.

4. The combination with an overpowered locomotive, of disconnectible driving means between an axle of its normal drivers and an axle of other weight-supporting wheels, for preventing slippage during acceleration.

5. The combination with an overpowered locomotive, of gearing for connecting an axle of other weight supporting wheels to an axle of its normal drivers, to prevent slippage during acceleration, with means for disconnecting said gearing from both axles when the locomotive comes up to speed.

In testimony whereof, I have hereunto signed my name.

FREDERICK W. MARTIN.